United States Patent Office 3,586,691
Patented June 22, 1971

3,586,691
PROCESS FOR PREPARING 2 - BENZO-
THIAZOLONES FROM AROMATIC NITRO
COMPOUNDS
Peter H. Scott, Guilford, Conn., assignor to
Olin Corporation
No Drawing. Filed Oct. 30, 1968, Ser. No. 772,029
Int. Cl. C07d 91/44
U.S. Cl. 260—304                                    7 Claims

ABSTRACT OF THE DISCLOSURE

In the process for preparing 2-benzothiazolones by reacting carbonyl sulfide with an aromatic nitro compound in which at least one of the two ortho positions is unsubstituted, the improvement which comprises carrying out the reaction in the presence of sodium hydrosulfide, and recovering the 2-benzothiazolones produced thereby.

---

This invention relates to a process for preparing 2-benzothiazolones from aromatic nitro compounds.

2-benzothiazolone, having the structural Formula I (I)

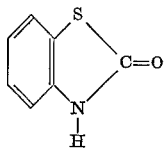

which is tautomeric with 2-hydroxybenzothiazole of structural Formula II, (II)

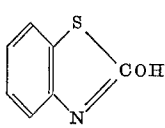

has been prepared in a variety of ways from ortho-aminothiophenol and phosgene, by hydrolysis of 2-chlorobenzothiazole, or by dealkylation of 2 - alkoxybenzothiazoles. These and other previously known techniques for preparing 2-benzothiazolones have been expensive and complicated.

2-benzothiazolones may be used to prepare derivatives such as 2-mercaptobenzothiazoles which are useful as accelerators in the vulcanization of rubber, and to prepare deriviatives which are useful as dyestuffs or as photographic sensitizers, and as cyanines.

It is a primary object of this invention to provide an improved process for preparing 2-benzothiazolones.

It is a further object of this invention to provide a process for preparing 2-benzothiazolones from aromatic nitro compounds.

These and other objects of the invention will be apparent from the following detailed description.

It has now been discovered that the foregoing objects are accomplished by reacting carbonyl sulfide with an aromatic nitro compound in which at least one of the two ortho positions is unsubstituted, in the presence of a catalytic proportion of sodium hydrosulfide, and recovering the resulting 2-benzothiazolone from the reaction mixture.

More in detail, any aromatic nitro compound having at least one of the two ortho positions unsubstituted may be employed as a reactant. The term "aromatic nitro compound," as used throughout the description and claims, is intended to include unsubstituted as well as substituted aromatic nitro compounds, with the provision that at least one of the two ortho positions is unsubstituted. Typical examples of suitable aromatic nitro compounds which can be reacted to form benzothiazolones include the following:

(1) nitrobenzene
(2) o-, m- or p-nitrotoluene
(3) o-, m- or p-monochloronitrobenzenes
(4) o,- m- or p-monofluoronitrobenzenes
(5) o-, m- or p-monobromonitrobenzenes
(6) 3- or 4- nitro-o-xylenes
(7) 4- or 5- or 6-nitro-m-xylenes
(8) 2-nitro-p-xylenes
(9) 3- or 4-nitro-o-dichlorobenzenes
(10) 4-, 5- or 6-nitro-m-dichlorobenzenes
(11) 2-nitro-p-dichlorobenzenes
(12) 3- or 4-nitro-o-dibromobenzenes
(13) 4- or 5-nitro-1,2,3-trichlorobenzenes
(14) 5- or 6-nitro-1,2,4-trichlorobenzenes
(15) o-, m- or p-nitro biphenyls
(16) 1- or 2-nitro naphthalenes
(17) bis(o-, m- or p-nitro phenyl)ethers
(18) bis(o-, m- or p-nitro phenyl)methanes
(19) bis(o-, m- or p-nitro phenyl)ethanes
(20) bis(o-, m- or p-nitro phenoxy)ethanes
(21) bis(o-, m- or p-nitro phenoxy)butanes
(22) bis(o-, m- or p-nitro phenyl)dialkylethers
(23) bis(o-m- or p-nitro phenoxy)dialkylethers All of the aforementioned compounds may be substituted with one or more additional substituents such as nitro, nitro-alkyl, alkyl, alkenyl, alkoxy, aryloxy, halogen, alkylthio, arylthio, carboxyalkyl, cyano, isocyanato, and the like, and employed as reactants in the novel process of this invention, provided that at least one of the two positions ortho to one of the nitro groups is unsubstituted.

In addition, isomers and mirtures of the aforesaid aromatic nitro compounds and substituted aromatic nitro compounds may also be employed, as well as homologues and other related compounds. Generally the aromatic nitro compounds and substituted aromatic nitro compounds contain between about 6 and about 16 carbon atoms.

Although the invention is described with respect to the use of an aromatic nitro compound as a reactant, this type of reactant can be replaced partially or totally with an aromatic nitroso compound, an aromatic azo compound or an aromatic azoxy compound. Thus, proportions of catalyst, carbonyl sulfide, solvent, and the like, although based upon the aromatic nitro compound, are also applicable to the use of an aromatic nitroso compound and the like, in the same proportions of addition per mole of the nitrogen-containing group, i.e., nitroso, azo, and azoxy.

The formation of benzothiazolones in the process of this invention is effected by carrying out the reaction in the presence of sodium hydrosulfide. The function of the sodium hydrosulfide in the reaction is not clearly understood. Among other things, it appears to function as a catalyst. Without being bound by theory, and solely for purposes of convenience, the sodium hydrosulfide is referred to herein as a "catalyst" even though it may have other functions in the reaction.

In carrying out the process of this invention, the aromatic nitro compound and catalyst are placed in a suitable pressure vessel, such as an autoclave, which is equipped with a gas sparger for feeding gas into the bottom thereof. The pressure vessel is also preferably provided with agitation means as well as cooling and heating means. After the slurry or solution of catalyst and aromatic nitro compound is placed into the pressure vessel, it is sealed, and carbonyl sulfide is pumped into the pressure vessel through the gas sparger until the desired pressure is obtained under the temperature conditions employed. Optionally a desired amount of carbonyl sulfide is added as a liquid, before the pressure vessel is closed, and the reaction is carried out at the pressure attained at the operating temperature.

After the desired temperature and pressure conditions are obtained, carbonyl sulfide may be fed continuously through the sparger into the suspension of catalyst and aromatic nitro compound during the entire reaction period while maintaining the pressure at the desired level, if desired.

The order of mixing the reactants is not critical and may be varied within the limitations of the equipment employed. In one embodiment, the aromatic nitro compound, catalyst, carbonyl sulfide in liquid form and, if desired, solvent, are charged to a suitable pressure vessel such as an autoclave which was previously purged with nitrogen, and which is preferably provided with agitation means such as a stirrer or an external rocking mechanism. The operating pressure can be attained by heating and/or by feeding carbonyl sulfide into the autoclave. The operating pressure after heating or after feeding carbonyl sulfide into the closed autoclave is in the range between about 30 and about 10,000 p.s.i.g., and preferably between about 100 and about 2000 p.s.i.g., but greater or lesser pressures may be employed if desired.

Generally the quantity of carbonyl sulfide in the free space of the reactor is maintained at a level sufficient to maintain the desired pressure as well as to provide reactant for the process, as the reaction progresses. If desired, additional carbonyl sulfide can be fed to the reactor either intermittently or continuously as the reaction progresses to maintain the pressure within the above range. The total amount of carbonyl sulfide added is generally between about 1 and about 50, and preferably between about 2 and about 15 moles of carbonyl sulfide per nitro group in the aromatic nitro compound. Greater or lesser amounts may be employed if desired. The highest carbonyl sulfide requirements are generally utilized in a process in which the gas is added continuously, but suitable recycle of the gas stream greatly reduces the overall consumption of carbonyl sulfide.

The molar proportion of catalyst to aromatic nitro compound in the reaction is generally equivalent to between about 1:1000 and about 1:1, and preferably between about 1:100 and about 1:2. However, greater or lesser proportions may be employed if desired.

The reaction between carbonyl sulfide and aromatic nitro compound may be effected in the absence of a solvent, but can also be performed in a solvent which is chemically inert to the components of the reaction system. Suitable solvents include aliphatic, cycloaliphatic, aromatic solvents, such as n-heptane, cyclohexane, benzene, toluene, and xylene, and halogenated aliphatic and aromatic hydrocarbons such as dichloromethane, trichloroethylene, perchloroethylene, tetrachloroethane, monochlorobenzene, dichlorobenzene, and chloronaphthalene, mixtures thereof and the like.

The proportion of solvent is not critical and any proportion may be employed which will not require excessively large equipment to contain. Generally the weight percent of aromatic nitro compound in the solvent is in the range between about 2.0 and about 75 percent, but greater or lesser proportions may be employed if desired.

The reaction temperature is maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, on the catalyst and on the amount of catalyst being charged, as well as the type of equipment being employed. Usually between one-half hour and 20 hours are required to obtain the desired degree of reaction in a batch operation, but shorter or longer degree reaction times may be employed. In a continuous process, the reaction time may be much lower, i.e., substantially instantaneous and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation may be employed to isolate the 2-benzothiazolones from the reaction product. However, other suitable separation techniques such as extraction with a base, sublimation, etc., may be employed to separate the 2-benzothiazolone from the unreacted aromatic nitro compound and any by-products that may be formed.

When aromatic nitro compounds are reacted with carbonyl sulfide in the presence of many basic catalysts, the predominant product is generally the corresponding aromatic isothiocyanate. When an inorganic sodium compound, such as sodium hydrosulfide, is used as the catalyst, it was unexpectedly discovered that the product predominated in the 2-benzothiazolone and no aromatic isothiocyanate was detected.

The following examples are presented to describe the invention more fully without any intention of being limited thereby. All parts and percentages are by weight unless otherwise specified.

EXAMPLE 1

A 300 milliliter stainless steel autoclave, secured to a mechanically driven rocking means, and having an internal cooling coil and an external heating mantle, was charged with 24.6 grams of nitrobenzene (0.20 mole), 70 percent sodium hydrosulfide (4.0 g., 0.05 mole), and 120 grams of carbonyl sulfide (2.0 moles). The autoclave had attained a pressure of about 1350 p.s.i.g. after it had been heated to between about 150 and 155° C. The rocking means, capable of rocking the autoclave at the rate of 36 cycles per minute, was operated during the 3 hour reaction period. At the end of this period, the autoclave was cooled to room temperature, gases were vented and the crude liquid reaction mixture was withdrawn.

The crude mixture was partitioned between water and ether, and the ether soluble fraction (19 g.) distilled under vacuum after the solvent had been removed. The main compound in the distillate (16 g.) as indicated by its IR spectrum was recovered nitrobenzene. The residue for the distillation was then extracted with 10 percent aqueous sodium hydroxide. The free 2-benzothiazolone precipitated from the basic solution upon acidification and was recrystallized from toluene to give 2.0 g. (29 percent corrected yield) of product, M.P. 131–135° C. The infrared spectrum of this product was identical to that of authentic 2-benzothiazolone.

Various modifications of the invention, some of which have been disclosed above, may be employed without departing from the spirit of the invention.

What is desired to be secured by Letters Patent is:

1. The process for preparing 2-benzothiazolones which comprises reacting carbonyl sulfide with an aromatic nitro compound having at least one of the two ortho positions unsubstituted, in the presence of a catalytic proportion of sodium hydrosulfide, said aromatic nitro compound containing between about 6 and 16 carbon atoms, and being selected from the group consisting of unsubstituted aromatic nitro compounds and substituted aromatic nitro compounds, wherein any substituent on said substituted aromatic nitro compound is selected from the group consisting of nitro, nitro-alkyl, alkyl, alkenyl, alkoxy, halogen, alkylthio, arylthio, carboxyalkyl, cyano and isocyanato being selected from the group consisting of

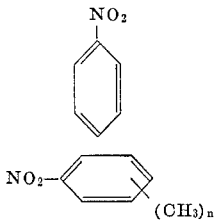

where $n$ is 1–2,

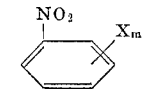

where X is halo and $m$ is 1–3,

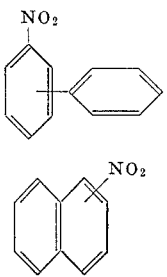

and

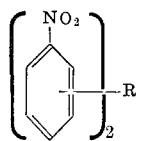

where R is oxygen or $C_1$–$C_4$ alkylene.

2. The process of claim 1 wherein the molar proportion of sodium hydrosulfide to said aromatic nitro compound is in the range of between about 1:1 and about 1:1000.

3. The process of claim 2 wherein the molar proportion of sodium hydrosulfide to said aromatic nitro compound is in the range between about 1:2 and about 1:100.

4. The process of claim 3 wherein the reaction temperature is in the range between about 100 and about 250° C. and the reaction pressure is in the range between about 100 and 2,000 p.s.i.g.

5. The process of claim 4 wherein said aromatic nitro compound is selected from the group consisting of nitrobenzene and ortho-chloro nitrobenzene.

6. The process of claim 5 wherein the molar proportion of carbonyl sulfide to aromatic nitro compound is in the range between about 2:1 and about 15:1.

7. The process of claim 6 wherein said aromatic nitro compound is nitrobenzene.

References Cited

UNITED STATES PATENTS 3,275,646  9/1966  Kirby et al. _____ 260—304

ALEX MAZEL, Primary Examiner

R. J. GALLAGHER, Assistant Examiner